(12) United States Patent
Robertson et al.

(10) Patent No.: US 7,415,839 B2
(45) Date of Patent: Aug. 26, 2008

(54) COOLER RECEPTACLE

(76) Inventors: Linda Robertson, 1912 Brittania Cir., Woodstock, GA (US) 30188; Clark Robertson, 1912 Brittania Cir., Woodstock, GA (US) 30188

( * ) Notice: Subject to any disclaimer, the term of this patent is extended or adjusted under 35 U.S.C. 154(b) by 50 days.

(21) Appl. No.: 11/285,893

(22) Filed: Nov. 23, 2005

(65) Prior Publication Data

US 2007/0113580 A1    May 24, 2007

(51) Int. Cl.
*F25D 3/02* (2006.01)
(52) U.S. Cl. .................................. 62/464; 62/457.2
(58) Field of Classification Search ................ 62/371, 62/344, 457.2, 464
See application file for complete search history.

(56) References Cited

U.S. PATENT DOCUMENTS

| | | | |
|---|---|---|---|
| 3,383,001 A | | 5/1968 | Wei |
| 4,542,826 A | | 9/1985 | Adams |
| 5,199,597 A | | 4/1993 | Gladish |
| 5,799,501 A | * | 9/1998 | Leonard et al. ............ 62/457.3 |
| 5,875,646 A | * | 3/1999 | Rich .......................... 62/457.3 |
| 6,065,303 A | * | 5/2000 | Harris ........................ 62/457.5 |
| 6,089,038 A | * | 7/2000 | Tattam ....................... 62/457.2 |
| 2003/0106895 A1 | | 6/2003 | Kalal |

OTHER PUBLICATIONS

The Search Report and Written Opinion developed by ISA/US in regard to counterpart International Application No. PCT/US06/45197, dated Aug. 9, 2007.

* cited by examiner

*Primary Examiner*—Melvin Jones
(74) *Attorney, Agent, or Firm*—Leatherwood Walker Todd & Mann, P.C.; Thomas W. Epting

(57) ABSTRACT

A receptacle for placement in a cooler of ice. The receptacle includes a sleeve structure placement in the cooler's ice compartment, the sleeve structure having a base portion and a chamber for receipt of a drink bottle or container, food item, medicine, or other items which require, or for which it is desirable, to maintain as chilled. The chamber is configured such that upon placement of the sleeve structure into the ice compartment and being surrounded by ice, the item to be cooled is substantially isolated and free from contact with the ice. The receptacle maintains an open volume in the ice for an item and allows for the item to be withdrawn from the cooler, without ice in the cooler collapsing and filling in the void left by the removed item. This allows the item may be readily reinserted back into the cooler when desired.

19 Claims, 5 Drawing Sheets

COOLER RECEPTACLE

BACKGROUND OF THE INVENTION

This invention relates to a receptacle to be used for holding items to be chilled in an ice-filled cooler.

Coolers find widespread use as portable cooling devices and ordinarily include a compartment for carrying ice pieces or bits in some form, such as shaved ice, cubed ice, crushed ice, chipped ice, etc. Coolers are used primarily for food and drink items, but also find use for chilling medicine and medical supplies and for items used commercially and industrially.

A problem with use of coolers using ice bits for cooling is that when an item is withdrawn from the cooler, the void left behind is filled by the ice bits collapsing around the volume formerly occupied by the withdrawn item. If the item is to be reinserted into the cooler, then it may be difficult to move the ice pieces aside in a manner adequate to allow such reinsertion. At a minimum, it may require the user to place his or her hands into the ice, causing the user's hands to get both cold and wet.

Also, if the ice pieces are to be used in drinks or for some other purpose, insertion of the user's hands into the ice may introduce contaminants to the ice.

Further, in some applications, it may be desirable to keep the item to be chilled dry. This ordinarily requires the item to be separated from the ice, since ice in a cooler typically melts over time, causing there to be ice/water slurry in the cooler which could contact the item getting it wet.

SUMMARY OF THE INVENTION

Generally, the present invention includes an apparatus for placement in a cooler of ice, the cooler defining an ice compartment for holding ice and liquid and for holding items to be cooled, including food items, fluid containers, medicine and medical supplies, industrial materials and supplies, and commercial materials and supplies, etc.

A sleeve structure is configured for readily removable placement in the ice compartment, the sleeve structure having a base portion and defining a chamber and an opening in communication with the chamber. The chamber is configured to receive at least one of the items, such that upon placement of the sleeve into the ice compartment and the sleeve structure being surrounded by ice in the ice compartment, the item is substantially isolated and free from contact with the ice.

In one preferred embodiment, the present invention may include attachment means, such as a suction cup, for releasably attaching the base of the sleeve structure to the floor of the cooler's ice compartment. The sleeve structure includes a medial portion connected to the base portion, and means for angling and extending the medial portion with respect to the base portion, using, for example, an accordion-type coupling. A lid can be used for releasable attachment to the sleeve structure for selectively sealing the chamber. An self-closing port can also be provided in the lid through which an item may extend above the top of the sleeve structure.

If desired, and if it is permissible for the item to get wet, side wall openings may be provided in the sleeve to allow melted ice to contact an item in the chamber for enhanced cooling.

The receptacle of the present invention is preferably configured to maintain an open volume amid the ice for an item and allows the item to be withdrawn from the cooler without the ice in the cooler collapsing around and filling in the void left by the removed item. By maintaining such an open volume, the item may be readily reinserted back into the cooler for further cooling.

BRIEF DESCRIPTION OF THE DRAWINGS

The foregoing, as well as other objects of the present invention, will be further apparent from the following detailed description of the preferred embodiment of the invention, when taken together with the accompanying specification and the drawings, in which.

DESCRIPTION OF THE PREFERRED EMBODIMENT

Figure 1:
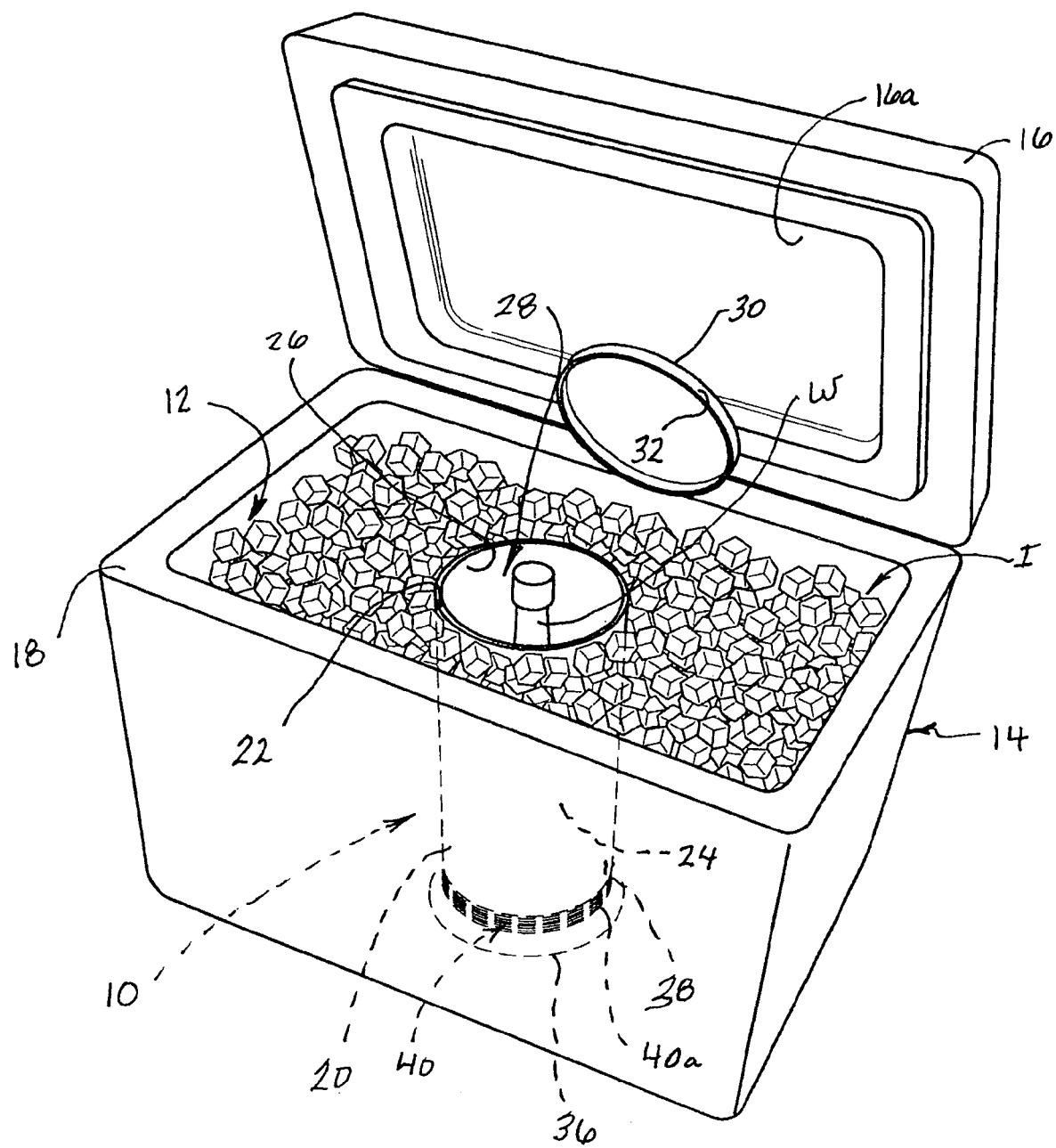
FIG. 1 is a perspective view of a cooler receptacle constructed in accordance with the present invention and placed within a cooler containing ice.

The foregoing, as well as other objects of the present invention, will be further apparent from the following detailed description of the preferred embodiment of the invention, when taken together with the accompanying drawings and the description which follows set forth this invention in its preferred embodiment. However, it is contemplated that persons generally familiar with coolers and cooler accessories will be able to apply the novel characteristics of the structures illustrated and described herein in other contexts by modification of certain details. Accordingly, the drawings and description are not to be taken as restrictive on the scope of this invention, but are to be understood as broad and general teachings.

Referring now to the drawings in detail, wherein like reference characters represent like elements or features throughout the various views, the cooler receptacle of the present invention is indicated generally in the figures by reference character 10.

Turning to FIG. 1, the cooler receptacle 10 of the present invention is illustrated within an ice compartment 12 of a cooler 14 substantially filled with ice bits or pieces, generally I. It is to be understood that the ice pieces I could be any of a number of forms, and/or combinations thereof, including shaved ice, cubed ice, crushed ice, chipped ice, etc.

Cooler 14 includes a lid 16 which may be separate from the body, generally 18, of cooler 14 or hinged or otherwise connected thereto. Lid 16 includes an underside portion 16a defining the upper limit of the ice compartment 12, when lid 16 is in the closed position.

Receptacle 10 includes an elongated cylindrical sleeve structure, or sleeve, generally 20, which includes a side wall portion 22 having an exterior surface 24 and an interior surface 26, the interior surface bounding and defining a chamber, generally 28, for receipt of an item to be cooled, such as a wine bottle, soft drink bottle, beer bottle, drink bottle, generally W, or some other fluid container. A chamber lid 30 is provided for releasably covering and sealing the opening of chamber 28, lid 30 having a circumferentially extending ring 32 which preferably engages through an interference fit the upper exterior surface of sleeve 20 to cover and seal chamber 28. Lid 30 allows for chamber 28 to be sealed, or substantially sealed, such that ice is prevented from falling into chamber 28 such as, for example, during transport of cooler 14.

A base portion, or base, generally 36, is attached to sleeve 20, and interposed between base portion 36 and a medial portion, generally 38, of sleeve 20 is a flexible coupling, generally 40, such as an accordion-type structure 40a, discussed in more detail below.

Figures 2, 3:
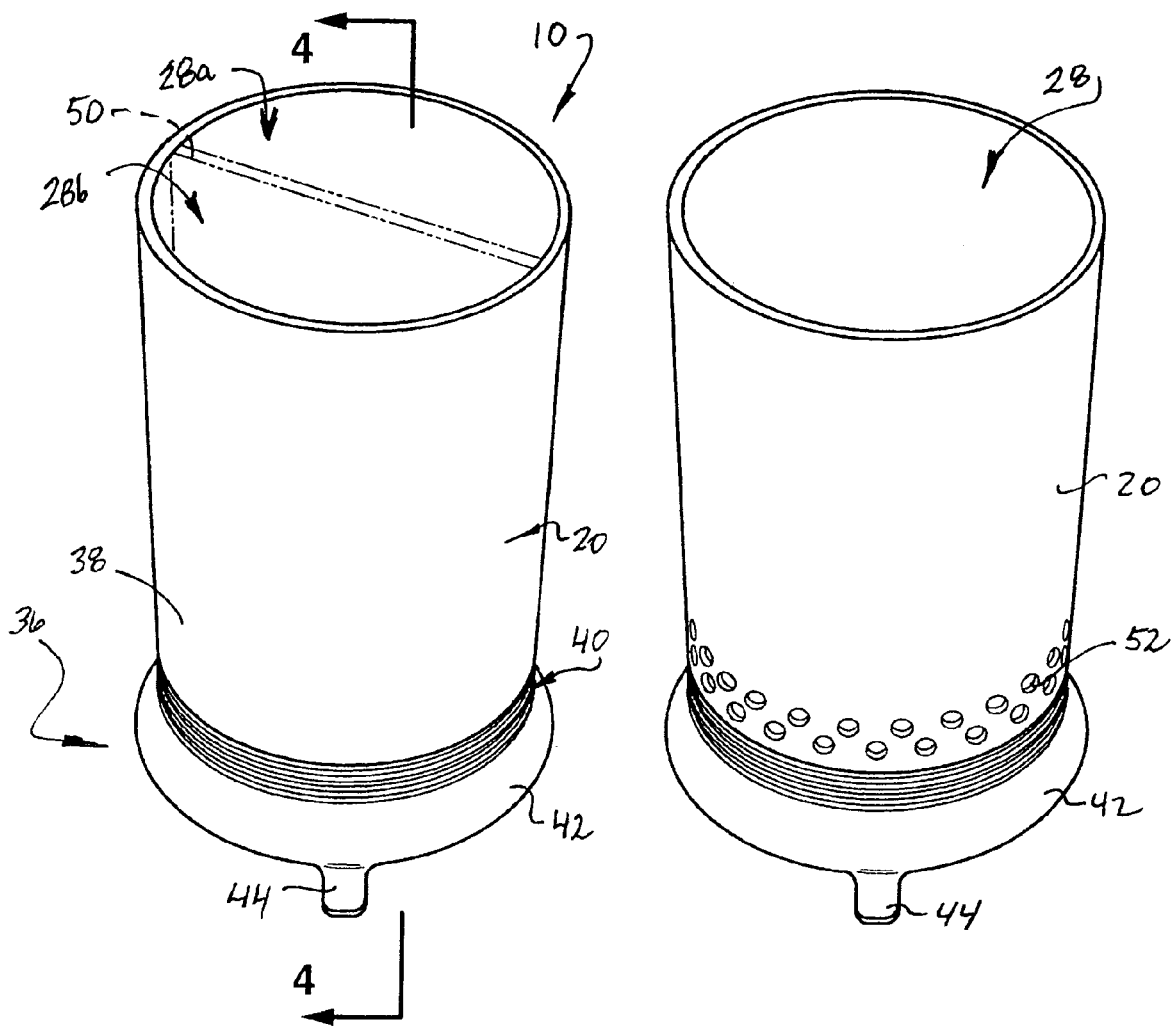
FIG. 2 is a perspective view of a cooler receptacle constructed in accordance with the present invention.
FIG. 3 is a perspective view of an alternate embodiment cooler receptacle constructed in accordance with the present invention.
Figure 4A:
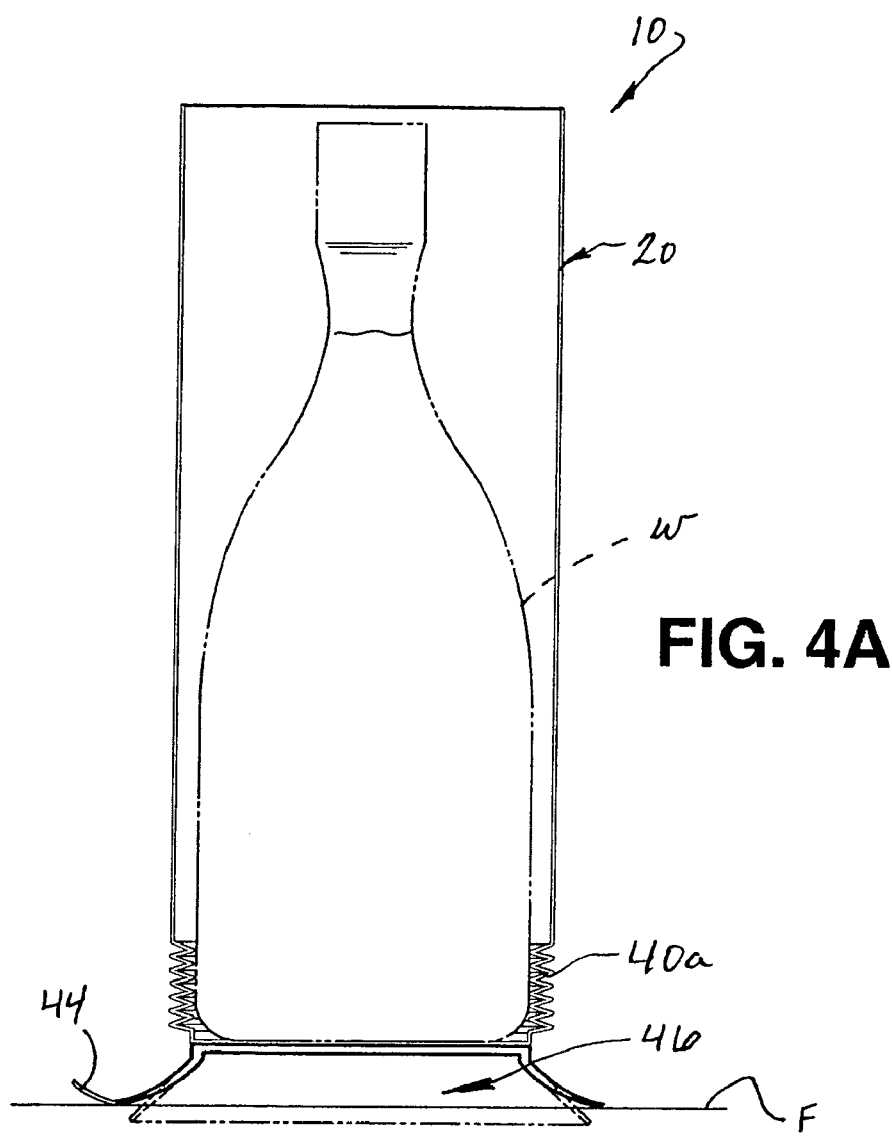
FIG. 4A is a sectional view taken along lines 4-4 of FIG. 2, showing the cooler receptacle in a retracted position.
Figure 4B:
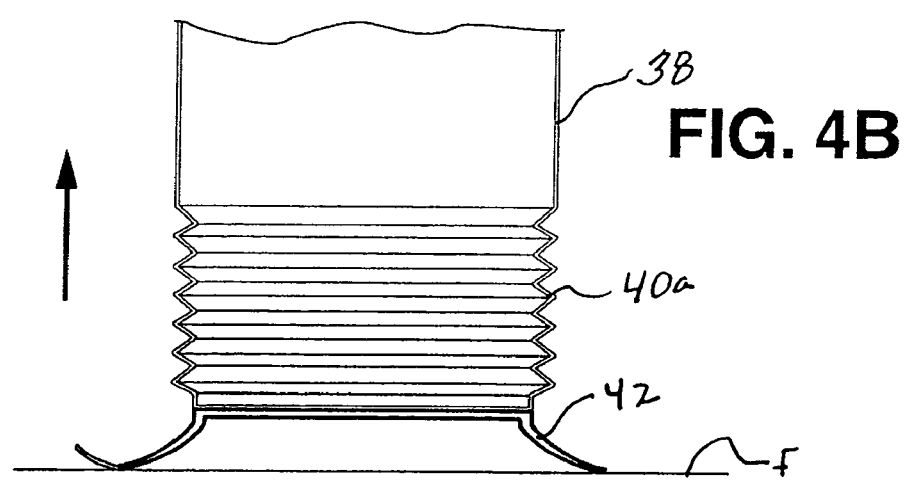
FIG. 4B is a sectional view taken along lines 4-4 of FIG. 2, showing the cooler receptacle in an extended position.

FIG. 2 illustrates receptacle 10 in isolation. Base portion 36 preferably includes means for releasably attaching receptacle 10 to the floor F of ice compartment 12 of cooler 14. In one embodiment, such means may include a suction cup, generally 42, which when depressed, as shown in FIG. 4A, causes suction to be created between base 36 and floor F of cooler 14, thereby attaching receptacle 10 to floor F. Suction cup 42 is provided with a release member, such as a release tab 44, which, when pulled upwardly, allows air to enter into the suction compartment 46 defined by suction cup 42, thereby releasing the suction of suction cup 42. This allows for receptacle 10 to be removed from cooler 14 and/or repositioned, if desired.

As also shown in FIG. 2, a divider panel, generally 50, which could be permanently or removably fixed in place, can be inserted in chamber 28 of sleeve 20, if desired, in order to create multiple compartments 28a and 28b for holding items within chamber 28.

FIG. 3 illustrates an alternate embodiment of the present invention, wherein sleeve 20 is provided with a plurality of vents or openings 52 which allow fluid communication between chamber 28 and ice compartment 12 of cooler 14. For example, in the event there is melted ice, i.e., water, in ice compartment 12, such water may pass through openings 52 and enhance the cooling of an item in chamber 28 by potentially improving heat transfer away from such item via the liquid water.

FIG. 4A illustrates suction cup 42 engaged with floor F of ice compartment 12, to secure receptacle 10 thereto. FIG. 4A also illustrates the accordion type flexible cup 42 being retracted or compressed, and a bottle W being carried within chamber 28. If the level of ice in a particular cooler 14 should extend to a height approaching or greater than the height of sleeve 20 when accordion structure 40a is compacted, then sleeve 20 may be pulled upwardly, thereby extending accordion structure 40a, and also effectively increasing the height of sleeve 20 to make the opening of sleeve 20 at a higher elevation than the elevation of the ice. This prevents ice from falling into chamber 28 if such is not desired.

Figure 7:
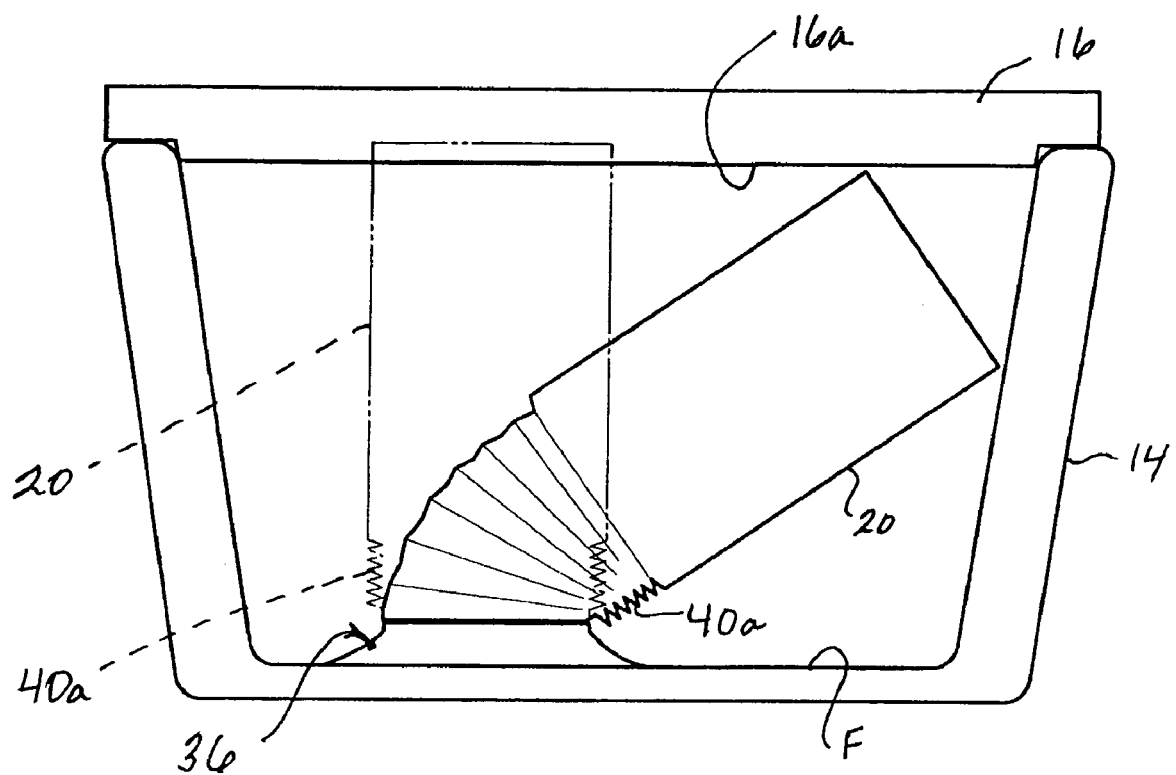
FIG. 7 is a sectional view of the cooler receptacle constructed in accordance with the present invention shown angled within an ice compartment of a cooler.

As shown in FIG. 7, accordion structure 40a may also allow sleeve 20 to be angled to one side of the cooler 14 or the other if a container, such as, perhaps, a wine bottle is too tall to fit within ice compartment 12 when standing vertical. Sleeve 20 can thus be angled to the side of cooler 14 to thereby provide adequate clearance between the top of the bottle W and the underside 16a of lid 16. It is to be understood, however, that various other flexible couplings could be provided other than that depicted in the drawings without departing from the present disclosure.

Figure 5:
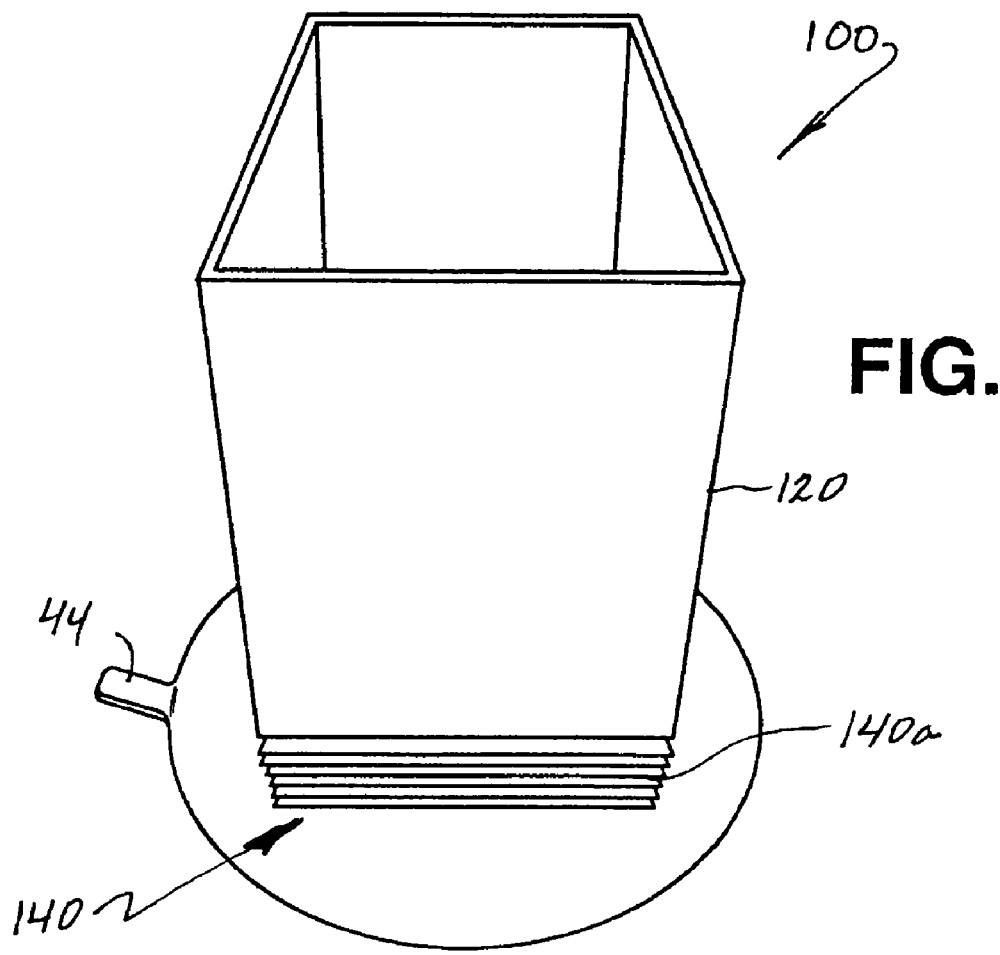
FIG. 5 is a perspective view of an alternate embodiment cooler receptacle constructed in accordance with the present invention.

FIG. 5 shows an alternate embodiment of receptacle 10, and is referred to by reference character 100. Receptacle 100 includes a sleeve 120 which is generally rectangular in cross section. A flexible coupling 140, such as an accordion-type structure 140a is also accordingly rectangular cross section. The rectangular cross section of receptacle 100 may be particularly suited for generally rectangularly shaped articles such as boxed food items, boxed medicine and medical supplies, boxed commercial or industrial products or supplies, etc. Also, such a rectangular cross section could also be used for holding plastic gallon jugs of milk or other beverages, or other liquids packaged in generally rectangular containers. The operation of receptacle 100, in other aspects, however, is similar to that discussed above relative to receptacle 10.

Figure 6:
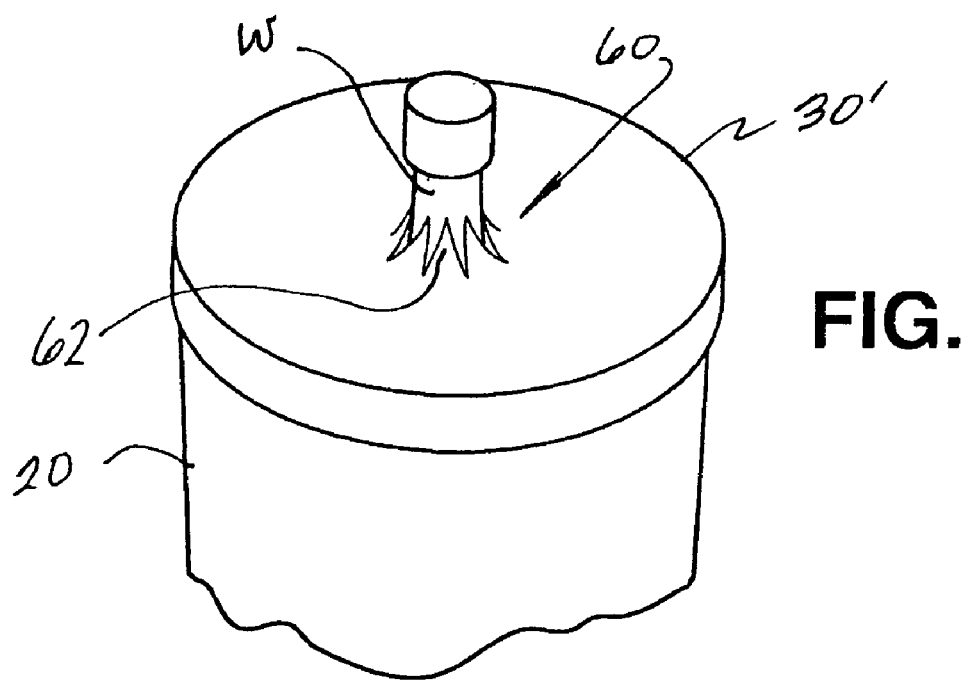
FIG. 6 is a partial perspective view illustrating a lid with a self-closing port for a cooler receptacle constructed in accordance with the present invention.

FIG. 6 illustrates an alternate embodiment of lid 30', having an open port (not shown) or a self-closing port, generally 60, which allows for an item which may extend beyond the height of sleeve 20 to be received by and extend through lid 30'. For example, the neck of the bottle W illustrated in FIG. 6 extends through flexible fingers or tabs, generally 62, in lid 30'. It is to be understood that various other self-closing ports could be provided other than that depicted in the drawings without departing from the teachings of the present invention. Similarly to lid 30 above, lid 30' also allows for chamber 28 to be substantially sealed such that ice is prevented from falling into chamber 28 during movement of cooler 14.

Chamber 28 is preferably configured such that upon placement of sleeve 20 into ice compartment 12 and surrounded by ice, the item to be cooled is substantially isolated and free from contact with the ice. Receptacles 10 and 100 of the present invention are configured to maintain an open volume amid the ice I for an item and allow for the item to be withdrawn from cooler 14 without ice collapsing and filling in the void left by the removed item. By maintaining such open volume, the item may be readily reinserted back into cooler 14 for further cooling.

Receptacles 10, 100, lids 30, 30', flexible coupling 40, and accordion structure 40a could all be made of plastic, metal, or some other suitable material.

While preferred embodiments of the invention have been described using specific terms, such description is for present illustrative purposes only, and it is to be understood that changes and variations to such embodiments, including but not limited to the substitution of equivalent features or parts, and the reversal of various features thereof, may be practiced by those of ordinary skill in the art without departing from the spirit or scope of the following claims.

What is claimed is:

1. An apparatus for placement in a cooler of ice, the cooler having an ice compartment for holding pieces of ice and liquid and for holding items to be cooled, including food items, fluid containers, medicine and medical materials, and industrial and commercial materials, the ice compartment having a floor, the apparatus comprising:

an elongated sleeve structure configured for readily removable placement in the ice compartment, said sleeve structure having a base portion and a medial portion and defining a chamber and an opening in communication with said chamber;

a suction structure connected to said base portion for releasably attaching said base portion to the floor of the ice compartment;

a flexible coupling connected to said base portion and to said medial portion for allowing said medial portion to be angled with respect to said base portion; and said chamber being configured to receive an item, such that upon placement of said sleeve structure into the ice compartment and said sleeve structure being bordered by pieces of ice in the ice compartment, such item is substantially isolated from contact with the pieces of ice.

2. An apparatus for placement in a cooler of ice, the cooler having an ice compartment for holding pieces of ice and liquid and for holding items to be cooled, including food items, fluid containers, medicine and medical materials, and industrial and commercial materials, the ice compartment having a floor, the apparatus comprising:
a sleeve structure configured for readily removable placement in the ice compartment, said sleeve structure having a base portion and defining a chamber and an opening in communication with said chamber;
attachment means for releasable attaching said base portion to the floor of the ice compartment; and
said chamber being configured to receive at least one of the items, such that upon placement of said sleeve into the ice compartment and said sleeve structure being bordered by pieces of ice in the ice compartment, said item is substantially isolated and free from contact with the pieces of ice.

3. The apparatus as defined in claim 2, wherein;
said sleeve structure is elongated; and
further comprising:
a medial portion connected to said base portion; and
means for angling said medial portion with respect to said base portion.

4. The apparatus as defined in claim 2, further comprising said sleeve structure defining a side wall portion and said side wall portion defining at least one opening for providing fluid communication between said chamber and the ice compartment.

5. The apparatus as defined in claim 2, wherein:
said sleeve structure is elongated; and
further comprising:
a medial portion connected to said base portion; and
a flexible coupling connected to said base portion and to said medial portion for allowing said medial portion to be angled with respect to said base portion.

6. The apparatus as defined in claim 2, further comprising said sleeve structure and said chamber being generally cylindrically shaped.

7. The apparatus as defined in claim 2, further comprising said sleeve structure and said chamber being generally rectangularly shaped.

8. The apparatus as defined in claim 2, wherein said attachment means includes a suction cup connected to said base portion.

9. The apparatus as defined in claim 2, wherein said attachment means includes a suction cup connected to said base portion; and further comprising an outwardly extending tab connected to said suction cup for allowing selective release of said base portion from the floor of the ice compartment.

10. The apparatus as defined in claim 2, further comprising a lid for releasable attachment to said sleeve structure for selectively substantially sealing said opening in said sleeve structure.

11. The apparatus as defined in claim 2, wherein said sleeve structure is generally elongated; and further comprising a divider for insertion into said chamber for longitudinally dividing said chamber into multiple chambers.

12. The apparatus as defined in claim 2, wherein:
said sleeve structure is elongated; and
further comprising:
a medial portion connected to said base portion; and
a flexible coupling connected to said base portion and to said medial portion for allowing said medial portion to be angled with respect to said base portion, while maintaining said base portion attached to the bottom of the ice compartment.

13. The apparatus as defined in claim 2, wherein:
said sleeve structure is elongated; and
further comprising:
a medial portion connected to said base portion; and
a flexible coupling connected to said base portion and to said medial portion for allowing said medial portion to be extended outwardly with respect to said base portion, while maintaining said base portion attached to the bottom of the ice compartment.

14. The apparatus as defined in claim 2, wherein:
said sleeve structure is elongated; and
further comprising:
a medial portion connected to said base portion; and
a flexible coupling connected to said base portion and to said medial portion for allowing said medial portion to be extended outwardly and angled with respect to said base portion, while maintaining said base portion attached to the bottom of the ice compartment.

15. The apparatus as defined in claim 2, further comprising:
a lid for releasable attachment to said sleeve structure for selectively substantially sealing said opening in said sleeve structure; and said lid defining a substantially self-closing port through which an item may extend upon the item being received in said chamber and said lid substantially sealing said chamber.

16. The apparatus as defined in claim 2, further comprising:
a lid for releasable attachment to said sleeve structure for selectively substantially sealing said opening in said sleeve structure; and said lid defining a pod through which an item may extend upon the item being received in said chamber and said lid substantially sealing said chamber.

17. The apparatus as defined in claim 2, wherein:
said sleeve structure is elongated; and
further comprising:
a medial portion connected to said base portion; and
an accordion structure coupling said base portion to said medial portion for allowing said medial portion to be angled with respect to said base portion.

18. An apparatus for placement in a cooler of ice, the cooler defining an ice compartment for holding pieces of ice and a drink container, the ice compartment having a floor, the apparatus comprising:
an elongated sleeve structure configured for readily removable placement in the ice compartment, said sleeve structure having a base portion and a medial portion and defining a chamber and an opening in communication with said chamber;
a suction cup connected to said base portion for releasably attaching said base portion to the floor of the ice compartment;
an accordion structure coupling said base portion to said medial portion for allowing said medial portion to be angled and elevated outwardly with respect to said base portion; and
said chamber being configured to receive a drink container, such that upon placement of said sleeve structure into the ice compartment and said sleeve structure being surrounded by pieces of ice in the ice compartment such drink container is iS substantially isolated and free from contact with the pieces of ice.

19. An apparatus for placement in a cooler of ice, the cooler having an ice compartment for holding pieces of ice and liquid and for holding items to be cooled, including food items, fluid containers, medicine and medical materials, and industrial and commercial materials, the ice compartment having a floor, the apparatus comprising:

an elongated sleeve structure configured for readily removable placement in the ice compartment, said sleeve structure having a base portion and a medial portion and defining a chamber and an opening in communication with said chamber;

a suction cup for releasably attaching said base portion to the floor of the ice compartment;

a tab connected to said suction cup for allowing selective release of said base portion from the floor of the ice compartment;

an accordion structure coupling said base portion to said medial portion for allowing said medial portion to be angled and elevated outwardly with respect to said base portion, while maintaining said base portion attached to the floor of the ice compartment;

a lid for releasable attachment to said sleeve structure for selectively substantially sealing said opening in said sleeve structure, said lid including a substantially self-closing port through which an item may extend upon the item being received in said chamber and said lid substantially sealing said chamber; and said chamber being configured to receive an item, such that upon placement of said sleeve structure into the ice compartment and said sleeve structure being surrounded by pieces of ice in the ice compartment, such item is substantially isolated from contact with the pieces of ice.

* * * * *